United States Patent [19]
Jones

[11] Patent Number: 4,856,814
[45] Date of Patent: Aug. 15, 1989

[54] ADJUSTABLE, PROPORTIONALLY STEERABLE AUXILIARY WHEEL ASEMBLIES FOR TRUCKS

[76] Inventor: Everett W. Jones, R.F.D. Rt. 80, Deep River, Conn. 06417

[21] Appl. No.: 11,196

[22] Filed: Feb. 5, 1987

[51] Int. Cl.⁴ .............................................. B60G 11/26
[52] U.S. Cl. .................. 280/704; 180/24.02; 180/209
[58] Field of Search ...................... 280/704; 180/24.01, 180/24.02, 209

[56] References Cited

U.S. PATENT DOCUMENTS

| | | | |
|---|---|---|---|
| 2,698,668 | 1/1955 | McKay | 180/24.01 |
| 3,903,979 | 9/1975 | Perrotin | 180/24.01 |
| 4,373,738 | 2/1983 | Lange | 280/704 |
| 4,383,696 | 5/1983 | Picard | 180/209 |

Primary Examiner—Kenneth R. Rice
Attorney, Agent, or Firm—Larson and Taylor

[57] ABSTRACT

A proportional steering arrangement is provided for the auxiliary wheel assembly of a truck or like vehicle. The auxiliary wheel assembly includes a secondary left axle which is raised when not in use and is lowered, in use, so that the auxiliary wheels contact the road. The proportional steering arrangement provides for steering of the auxiliary wheels as a percentage of the steering provided for the steerable front wheels. In one embodiment, a mechanical connection is provided between the front wheel steering assembly and an auxiliary wheel steering assembly. In a further embodiment, master and slave hydraulic steering cylinders, connected by suitable hoses, are mounted on the front and auxiliary axles and a percentage steering adjustment device, preferably in the form of a fulcrum lever on the front axle, is provided.

15 Claims, 4 Drawing Sheets

ADJUSTABLE, PROPORTIONALLY STEERABLE AUXILIARY WHEEL ASEMBLIES FOR TRUCKS

FIELD OF THE INVENTION

The present invention relates to auxiliary wheel assemblies for over-the-road vehicles such as trucks.

BACKGROUND OF THE INVENTION

Auxiliary or secondary wheel assemblies are commonly used to provide improved load distribution on trucks or like vehicles used for hauling heavy loads. The wheel assemblies are not needed in many other circumstances such as when the load has been dumped or otherwise unloaded or when hauling light loads or when the tractor portion of a tractor-trailer is driven alone. Because of this, such auxiliary wheel assemblies typically include a lift mechanism which permits the secondary wheels to be raised out of contact with the ground.

Some of the prior art auxiliary wheel assemblies are capable of being steered in order to overcome steering problems encountered on turns with wheel assemblies wherein the auxiliary wheels are fixed, and one example of such an arrangement is disclosed in U.S. Pat. No. 4,373,738 (Lange). The Lange patent discloses an auxiliary wheel assembly including a transverse axle member extending below the vehicle frame, a king pin assembly on each of the outer ends of the axle member, and a tie rod interconnecting the auxiliary wheels so that the wheels steered together. In one embodiment mentioned in the Lanage patent, the auxiliary wheels are connected to the front wheels of the vehicle through a hydraulic actuation system so that the auxiliary wheels are steered along with the front wheels.

A serious disadvantage of a steering system such as disclosed in the Lange patent wherein the front wheels and auxiliary wheels steer together is the lack of stability provided on turns at high speeds and or with top heavy loads. This lack of stability can result in skidding and slipping and obviously can be very dangerous particularly with larger, heavier vehicles.

Other patents of interest in this field include U.S. Pat. Nos. 4,398,738 (McDaniel); 4,383,696 (Picard); 3,831,210 (Ow); 3,704,896 (Buelow) and 3,390,895 (Verdi), which disclose various forms of retractable wheels assemblies some of which are steerable or capable of being steered.

SUMMARY OF THE INVENTION

In accordance with the present invention, an improved vehicle of the type described above is provided which affords substantially better handling particularly when the vehicle is loaded and the secondary axle is down, i.e., being used. A truck or like vehicle equipped with the invention maneuvers around turns very easily, while providing excellent tracking and eliminating front end "plowing". The steering provided is highly responsive and it is much easier to back the vehicle around, particularly under wet, muddy or even icy conditions. In addition, tire mileage is substantially improved. Further, stopping is also improved when the secondary axle is used.

In general, the invention relates to an improvement in a wheeled vehicle, such as a truck, comprising set of steerable front wheels which are steerable in response to vehicle steering means, at least one set of fixed rear wheels, and an intermediate set of liftable, auxiliary wheels including means for raising and lowering the auxiliary wheels so that the auxiliary wheels are movable between a first, raised position out of contact with the road surface and a second position in which to auxiliary wheels are in contact with that surface, and, broadly speaking, the improvement comprises the provision of proportional steering means, responsive to the vehicle steering means for the front wheels, for providing proportional steering of the auxiliary wheels relative to the steering of the front wheels provided by the vehicle steering means, i.e., for providing steering of the auxiliary wheels in an amount which is a predetermined percentage of the steering provided for the front wheels.

In one embodiment, the proportional steering means preferably includes means for adjusting the percentage steering provided for the auxiliary wheels in relationship to the steering provided for the front wheels. In accordance with this embodiment, the proportional steering means advantageously includes a master hydraulic steering cylinder mounted on an axle of the set of front wheels, a slave hydraulic steering cylinder mounted on an axle of the auxiliary wheels, a hydraulical connection interconnecting the master cylinder and the slave cylinder, and adjustment means for adjusting the percentage that the auxiliary wheel axle turns with respect to the front wheel axle. The adjustment means preferably comprises a fulcrum lever mounted on the front wheel axle.

In accordance with a further embodiment, the proportional steering means comprises mechanical means interconnecting the steering means for the front wheels with steering means for the auxiliary wheels. In accordance with this embodiment, the steering means for the front wheels includes a front axle steering spindle, and the proportional steering means includes an auxiliary axle steering spindle for the auxiliary wheels and drag link means interconnecting the front axle steering spindle and the auxiliary axle steering spindle.

Advantageously, an auxiliary braking means, controllable from the main braking system, is provided for controlling braking of said auxiliary wheels.

Other features and advantages of the invention will be set forth in, or apparent from, the detailed description of a preferred embodiments of the invention which follows.

DESCRIPTION OF THE PREFERRED EMBODIMENTS

Figure 1:
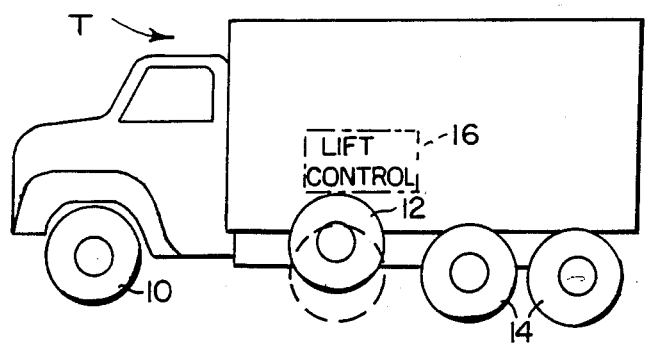
FIG. 1 is a schematic side elevational view of a truck incorporating a lift control arrangement for a set of secondary or auxiliary wheels.

Referring to FIG. 1, a schematic representation is provided of a truck generally denoted T, which includes steerable front wheels 10, steerable and liftable intermediate auxiliary or secondary wheels 12, and two sets of fixed rear wheels 14. A conventional lifting control unit 16, indicated schematically at 18, is provided for the intermediate wheels 12 which permits movement of these wheels between a raised position wherein the wheels 12 are out of contact with the road (shown in solid lines in FIG. 1) and a lowered position, wherein wheels 12 are in contact with the road (shown in dashed lines in FIG. 1). The lifting control unit 16 can take a number of forms including those disclosed in the patents discussed above and the overall intermediate lift axle assembly can be, for example, a Turner "Quick Lift" third axle assembly. The details of the basic lift axle assembly form no part of the invention and given the conventional nature of such assemblies, further description thereof is not seen to be necessary.

Figure 2:
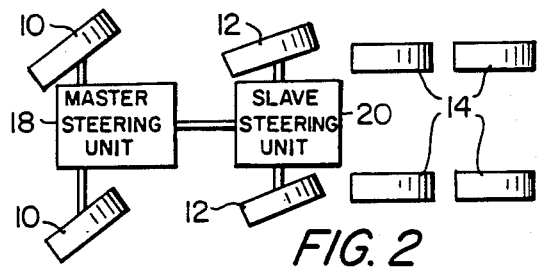
FIGS. 2 and 3 are schematic, top plan views of the wheel assemblies of a truck incorporating the invention, showing two different positions of the front and secondary wheel sets.
Figure 3:
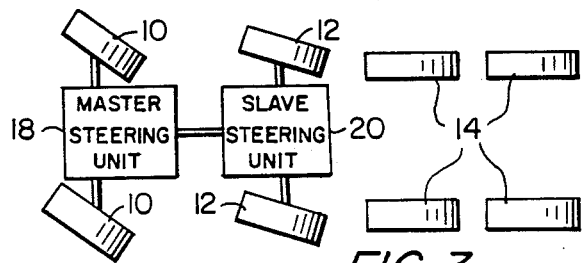

Referring to FIGS. 2 and 3, a pair of highly schematic top plan views are provided which show the basic operating principles of the system of the present invention FIG. 2 shows the steerable wheels 10 and 12 turned in a first direction, towards the right as viewed in FIG. 2, while FIG. 3 shows the steerable wheels 10 and 12 turned in the opposite direction, i.e., towards the left. As discussed above, a key feature of the invention concerns the provision of a steering control system for controlling steering of the auxiliary wheels 12 so that these wheels turn an amount which is a predetermined percent of the amount that the front wheels 10 turn. This percent is, in an exemplary embodiment discussed below, about 40% and depends, in general, on the ratio of the distance between the front wheels 10 and the intermediate wheels 12 to the distance between the front wheels 10 and the rearmost of the rear wheels 14, i.e., the overall wheel base of the truck. As discussed above, the purpose of providing proportional steering include ensuring a coordinated turning operation and preventing oversteering by the auxiliary wheels.

Figure 4:
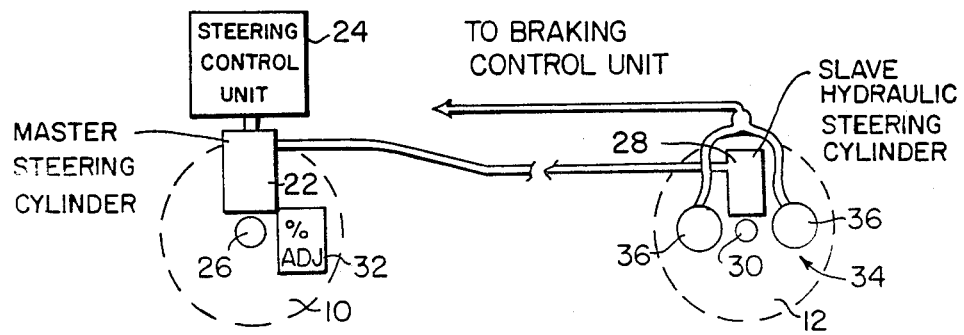
FIG. 4 is a schematic side elevational view of a first embodiment of the steering control system of the invention.

In one exemplary preferred embodiment of the invention, a hydraulic coupling is provided between the basic steering unit or assembly (indicated at 18 in FIGS. 2 and 3) and the auxiliary or slave steering unit or assembly (indicated at 20 in FIGS. 2 and 3) using a pair of hydraulic steering booster pistons which are of the same size and which are connected together by hydraulic hoses. This arrangement is illustrated in a highly schematic manner in FIG. 4, wherein a master hydraulic steering cylinder 22 connected to the main steering control unit 24 is mounted on the front axle 26 and a slave hydraulic steering cylinder 28 is mounted on the axle 30, and a percent steering adjustment arrangement, indicated schematically at 32 and preferably in the form of an adjustable fulcrum lever on the front axle 26, is provided for adjusting the percentage steering of the auxiliary or intermediate axle 30 relative to the front axle 26. As shown in FIG. 4, an auxiliary braking system 34, in the form of disc brakes 36 connected to the main braking unit, provides braking of the intermediate wheels 12.

Figure 5:
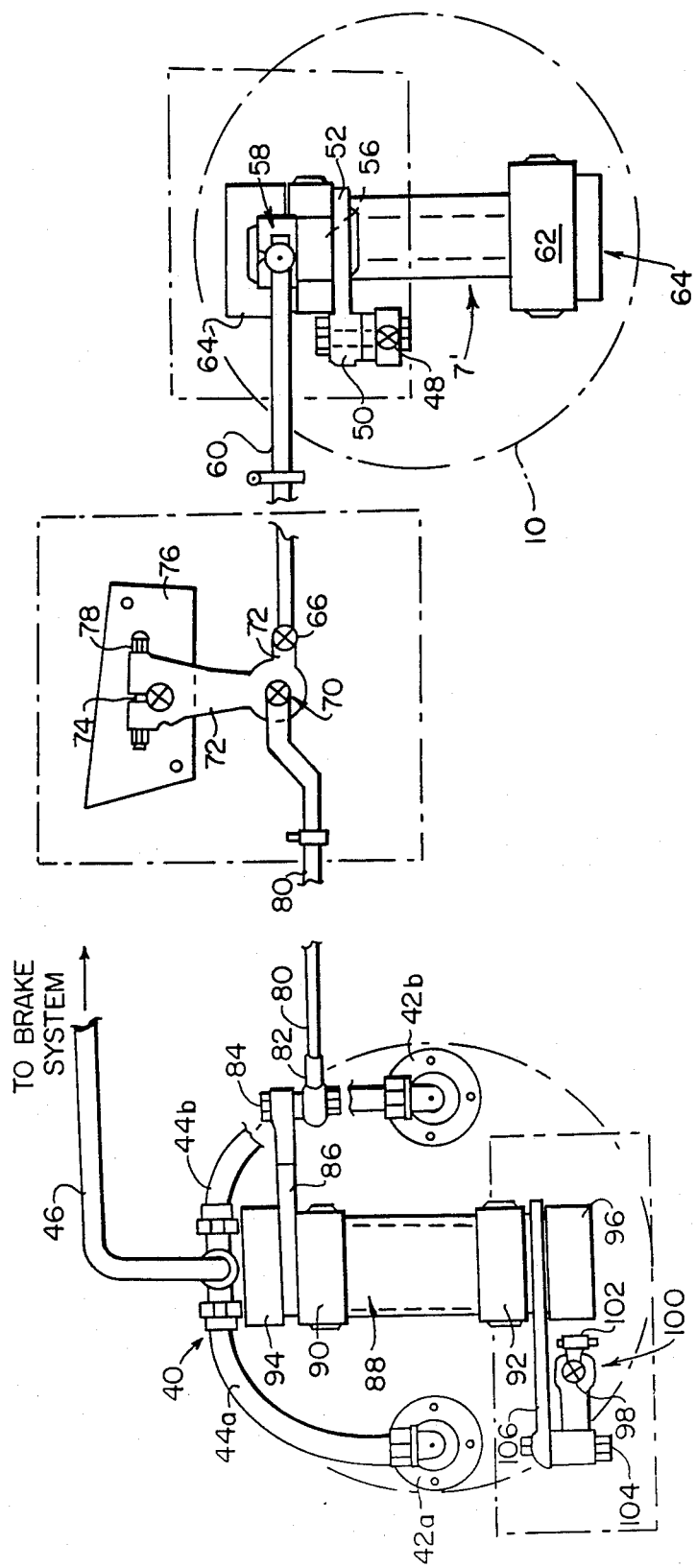
FIG. 5 is a side elevational view, from the back of the left front wheel and the corresponding secondary wheel, showing the wheel assemblies, interconnecting mechanical steering system, and the braking system for the secondary wheel, in accordance with a further embodiment of the invention.

Referring to FIG. 5, a further preferred embodiment of the invention is shown wherein an existing third wheel lift mechanism is modified to provide braking and steering. In general, this embodiment results from removing the axle, brakes, wheels and associated equipment on an existing truck and substituting, for example, a heavy-duty Rockwell 20,000 lb. front steering axle with 6"×15" wedge brakes, with the brake lines being attached to the existing brake system of the trucks so that the brakes operate each time the brakes are applied, regardless of whether the auxiliary wheel, denoted 12 in FIG. 5, are raised or lowered. The braking arrangement is indicated at 40 in FIG. 5, and includes a pair of wedge brakes 42a and 42b, a pair of branch brake lines 44a and 44b and a common brake line 46 connected to the main vehicle brake system. FIG. 5 also shows the overall steering arrangement and FIG. 5 will be considered with FIGS. 6 to 9, which show portions of the overall system in describing the steering system of this embodiment.

Figure 6:
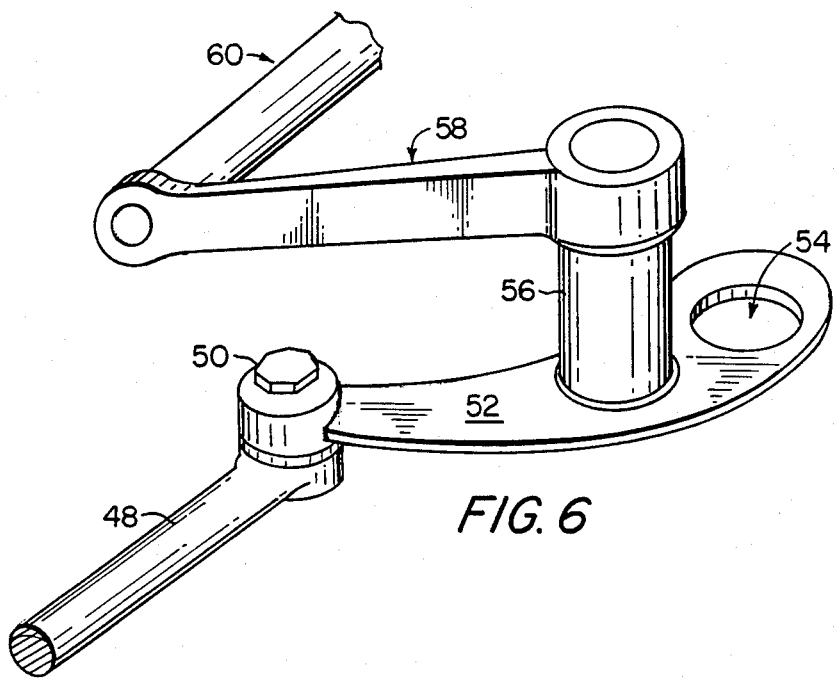
FIG. 6 is a perspective view of the connection between the left front steering spindle and a drag link for the second wheel assembly of FIG. 5.

Referring to FIGS. 5 and 6, the connecting mechanism between the front wheel steering (for left front wheel 10) and left auxiliary wheel 12, includes a front tie rod and steering control arm 48, a pivot pin 50, and a pivotably mounted front steering spindle 52 as illustrated in FIG. 6, the steering spindle 52 includes an opening 54 for a king pin assembly (not shown in FIG. 6). A pivot pin 56 acts as a pivot shaft for steering spindle 52 and for a pivot link 58 for a forward drag link 60. A king pin support member 62 (see FIG. 5) is part of the king pin assembly which is generally denoted 64 and is indicated schematically in FIG. 5.

Figure 7:
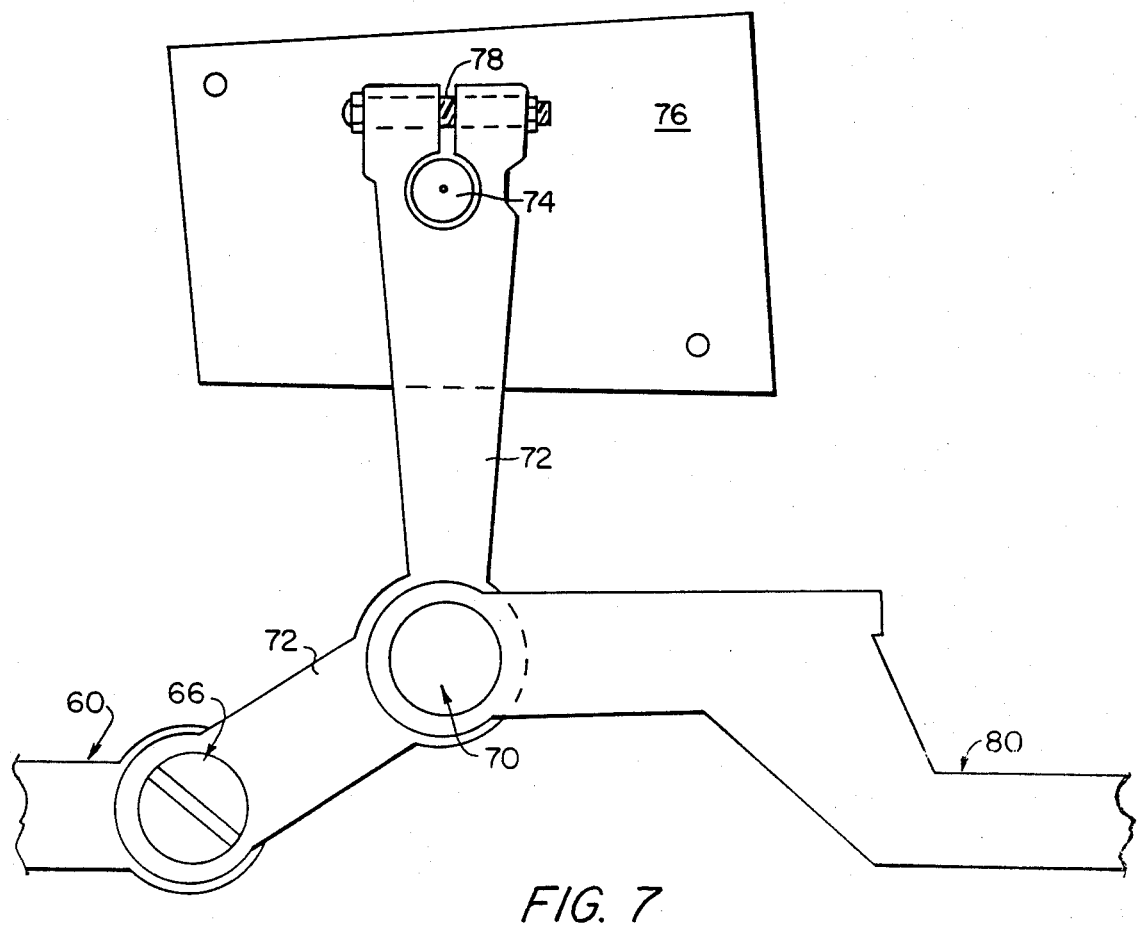
FIG. 7 is a detail of an arrangement for supporting the drag link connections of FIG. 5, from the opposite side.
Figure 8:
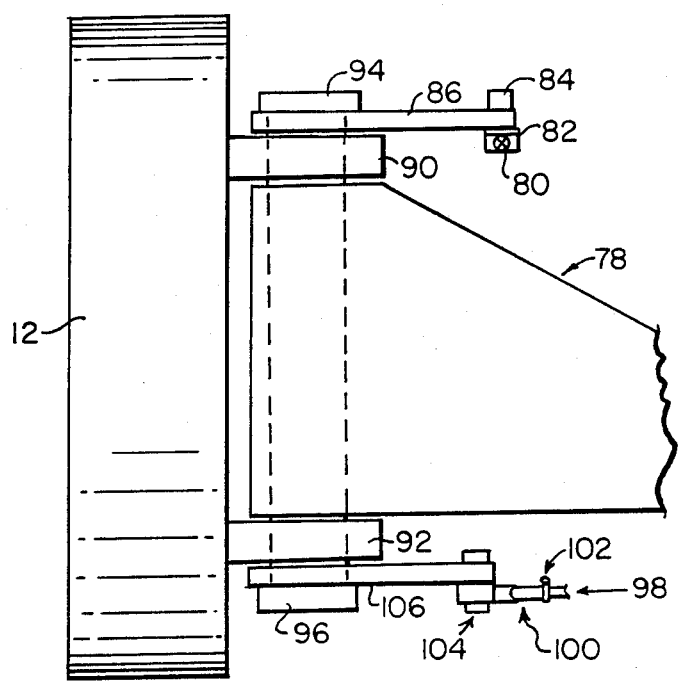
FIG. 8 is an end elevational view of the secondary wheel assembly of FIG. 5.

Referring to FIG. 5 and FIG. 7 (which, as noted above, is a view opposite from that of FIG. 5), the connection between the front and rear wheel steering includes a chassis mounted support arrangement best seen in FIG. 7. The front drag link 60 is pivotably connected by a pivot pin or bolt 66 to arm 72. A pivot arm connecting pin 70 provides a pivot connection for a pivot arm 72 which is, in turn, pivotably mounted on a pivot pin 74 connected to a mounting bracket or brace 76 secured to the vehicle chassis. In FIG. 7, a tension bolt for pivot arm 72 is indicated at 78 and a rear drag link at 80.

As shown in FIG. 5, the connection between the rear drag link 80 and the auxiliary wheel steering mechanism includes a pivot connector 82 which connected by a pivot pin 84 to an upper steering spindle 86. The steering spindle 86 is of the type described previously and as can best be seen in FIG. 8 (which shows an orthogonal view). The arrangement further includes a support member 88 for one of the wheels 12 and a king pin support arrangement including supports 90 and 92 and king pin members 94 and 96.

Figure 9:
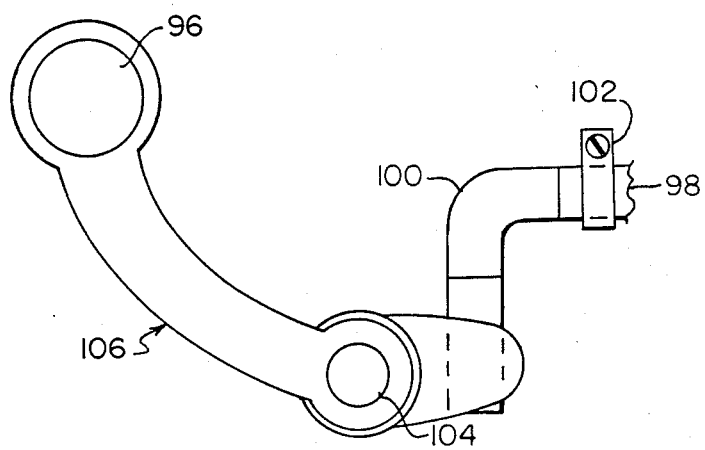
FIG. 9 is a top plan view of a secondary linkage between a secondary tie rod and a secondary steering spindle of the secondary wheel assembly, showing the attachment to the lower end of the king pin arrangement of the secondary wheel assembly of FIG. 5.

Referring to FIGS. 5 and 9, a lower tie rod connection assembly includes a second tie rod 98, an elbow connector 100, elbow mounting bracket 102, a pivot pin 104, a further auxiliary steering spindle 106, and the auxiliary king pin member 96.

Considering a specific numerical example in connection with the embodiment of FIGS. 5 to 9, with a truck having overall wheelbase of 188" and a wheelbase for the secondary wheels 12 of 76", the ratio or percentage of the latter to the former is 40%. This is amount that the axle of the secondary wheels 12 is required to turn with respect to the axle of the front wheels 10 and this is achieved by attaching the drag link for the secondary axle (formed by front drag link 60 and rear drag link 80 in the exemplary embodiment of FIGS. 5 to 9) to the front axle steering spindle 52 at 40% of the radius through which the front axle steering spindle 52 is permitted to turn. It will be appreciated that this percentage and the specific embodiment shown in FIGS. 5 to 9 are merely exemplary and other mechanical connecting arrangements between the front and secondary steering assemblies can be used.

Although the present invention has been described relative to the exemplary embodiments thereof, it will be understood by those skilled in the art that variations and modifications can be effected in these exemplary embodiments without departing from the scope and spirit of the invention.

I claim:

1. In a wheeled over the road vehicle comprising a set of steerable front wheels which are steerable in response to vehicle steering means, at least one set of fixed rear wheels, and an intermediate set of liftable, auxiliary wheels including means for raising and lowering the auxiliary wheels so that the auxiliary wheels are movable between a first, raised position out of contact with the road surface and a second position in which the auxiliary wheels are in contact with that surface, the improvement comprising proportional steering means, responsive to the vehicle steering means for the front wheels, for providing proportional steering of the auxiliary wheels relative to the steering of the front wheels provided by the vehicle steering means as a fixed percentage of the steering of the front wheels corresponding to the ratio of the distance between the front wheels and the auxiliary wheels to the distance between the front wheels and the rear wheels.

2. A wheeled vehicle as claimed in claim 1 wherein said proportional steering means includes means for adjusting the percentage steering provided for the auxiliary wheels in relationship to the steering provided for the front wheels.

3. A wheeled vehicle as claimed in claim 1 wherein said proportional steering means includes a master hydraulic steering cylinder mounted on an axle of the set of front wheels, a slave hydraulic steering cylinder mounted on an axle of the auxiliary wheels, a hydraulical connection interconnecting the master cylinder and the slave cylinder, and adjustment means for adjusting the percentage that the auxiliary wheel axle turns with respect to the front wheel axle.

4. A wheeled vehicle as claimed in claim 3 wherein said adjustment means comprises a fulcrum lever mounted on the front wheel axle.

5. A wheeled vehicle as claimed in claim 1 wherein said proportional steering means comprises mechanical means interconnecting the steering means for the front wheels with steering means for the auxiliary wheels.

6. A wheeled vehicle as claimed in claim 1 wherein said steering means for the front wheels includes a front axle steering spindle, and said proportional steering means includes an auxiliary axle steering spindle for the auxiliary wheels and drag link means interconnecting the front axle steering spindle and the auxiliary axle steering spindle.

7. A wheeled vehicle as claimed in claim 1 wherein the vehicle includes a main wheel braking system for controlling braking of the front wheels and further auxiliary braking means, connected to and controllable from said main braking system, for controlling braking of said auxiliary wheels.

8. A wheel assembly for a truck or like vehicle, said wheel assembly including a set of rear wheels, a set of front wheels, front wheel steering means for steering said front wheels, auxiliary wheels located rearwardly of the front wheels and in front of said rear wheels, means for providing raising and lowering of the auxiliary wheels, and proportional steering means, responsive to the front wheel steering provided by said front wheel steering means, for providing proportional steering of the auxiliary wheels as a percentage of the front wheel steering, said percentage corresponding to the ratio of the distance between the front wheels and the auxiliary wheels to the distance between the front wheels and the rear wheels.

9. A wheel assembly as claimed in claim 8 wherein said proportional steering means includes a master hydraulic steering cylinder mounted on a steering axle of the set of front wheels, a slave hydraulic steering cylinder mounted on a steering axle of the auxiliary wheels, a hydraulic connection interconnecting the master cylinder and the slave cylinder, and adjustment means for adjusting the percentage that the auxiliary wheel axle turns with respect to the front wheel axle.

10. A wheel assembly as claimed in claim 9 wherein said adjustment means comprises a fulcrum lever mounted on the front wheel axle.

11. A wheel assembly as claimed in claim 8 wherein said proportional steering means comprises mechanical means interconnecting the steering means for the front wheels with steering means for the auxiliary wheels.

12. A wheel assembly as claimed in claim 8 wherein said steering means for the front wheels includes a front axle steering spindle and said proportional steering means includes an auxiliary axle steering spindle for the auxiliary wheels and drag link means interconnecting the front axle steering spindle and the auxiliary axle steering spindle.

13. A wheel assembly as claimed in claim 8 wherein said the vehicle includes a main wheel braking system for the front wheels and further auxiliary braking means, controllable from said main braking system, for controlling braking of said auxiliary wheels.

14. A wheel assembly as claimed in claim 13 wherein said auxiliary braking means includes at least one disc brake and means for connecting the at least one disc brake to the main braking system.

15. A wheel assembly as claimed in claim 8 wherein said proportional steering means further comprises means for adjusting the proportional amount of steering provided for the auxiliary wheels in relation to the front wheels.

* * * * *